Oct. 7, 1969     E. LIESER ET AL     3,470,801
ROLL FILM PHOTOGRAPHIC CAMERA WITH
FILM TRANSPORT MECHANISM

Filed Sept. 2, 1966     2 Sheets-Sheet 1

ERNST LIESER
KURT STEISSLINGER
OSWIN MAGNUS
INVENTORS

BY Robert W Hampton

ATTORNEYS

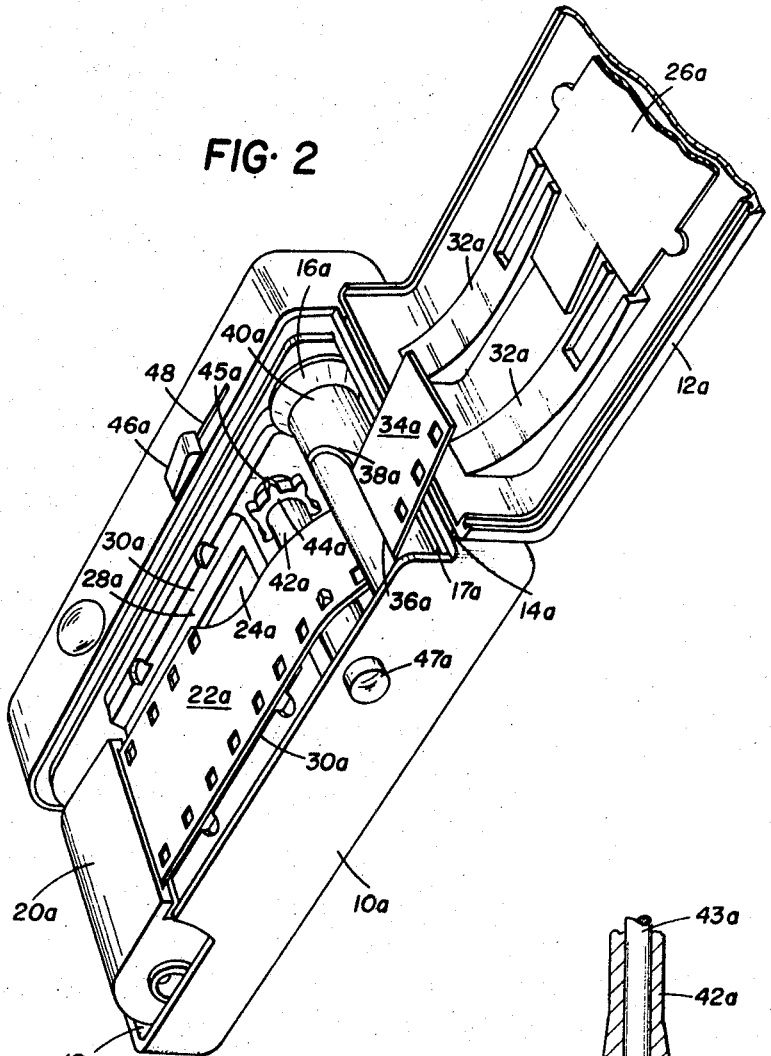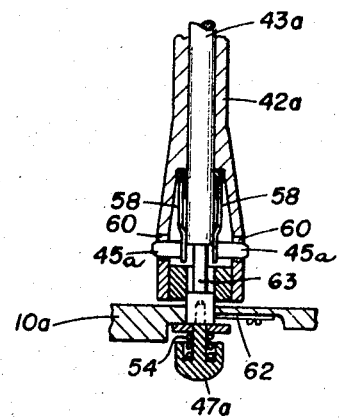

United States Patent Office 3,470,801
Patented Oct. 7, 1969

3,470,801
ROLL FILM PHOTOGRAPHIC CAMERA WITH FILM TRANSPORT MECHANISM
Ernst Lieser, Kurt Steisslinger, and Oswin Magnus, Stuttgart-Wangen, Germany, assignors to Eastman Kodak Company, Rochester, N.Y., a corporation of New Jersey
Filed Sept. 2, 1966, Ser. No. 577,102
Claims priority, application Germany, Sept. 11, 1965, K 57,108
Int. Cl. G03b 19/04; G11b 15/32
U.S. Cl. 95—31                              7 Claims

ABSTRACT OF THE DISCLOSURE

A roll film photographic camera having a take-up spool driven by a slip clutch, and a film transport mechanism including a sprocket advancing film at a rate equal to or less than the take-up rate of the spool, the difference being compensated for by the slip clutch. The sprocket includes teeth that can be retracted for rewinding.

---

This invention relates to photographic cameras and specifically to a camera adapted for the use of roll films as well as films contained in cartridges, cassettes or the like.

In the typical photographic camera, the leading portion of film is secured to the take-up spool before or after insertion of the film into the camera. The process is troublesome and requires a certain skill. To eliminate this task, film magazines were designed which need only be inserted in the camera. Such magazines however can only be used with cameras specifically designed to use them and their use is accordingly limited to specific camera models.

It is a principal object of the present invention to facilitate insertion of a film into a camera.

Another object of the invention is to simplify the attachment of the leading portion of a conventional film, to the take-up spool of a camera.

Another object of the invention is to define the advance movement of a film during film transport.

Another object of the invention is to provide an improved means for transporting film to a take-up spool which permits smooth rewind operation.

In a preferred embodiment of the invention a film transporting means is positioned between a film supply means and a take-up spool. A drive mechanism is effective to drive the film transporting means and take-up spool in a manner such that the film take-up rate of the take-up spool is equal to or exceeds the linear film transfer rate of the film transporting means. The leading portion of the film is inserted in the take-up spool during insertion of the film in the camera. Initial advance movement of the drive mechanisms drives the film transporting means to transport the film and the take-up spool to secure the film to the latter.

Other objects and advantages will become apparent from the following description taken in connection with the accompanying drawings wherein:

FIG. 2 is a view similar to FIG. 1 illustrating another embodiment of the invention; and FIG. 3 is an enlarged sectional view of a subassembly depicted in FIG. 2.

Figure 1:
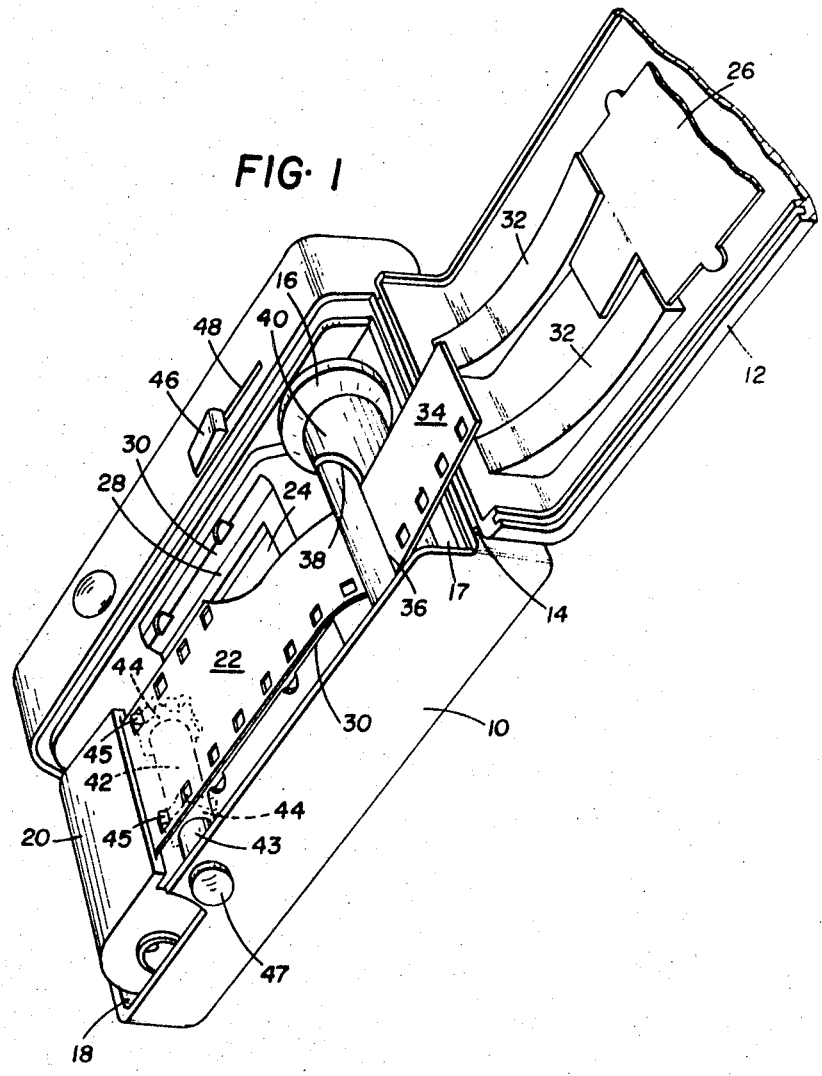
FIG. 1 is a perspective view of a photographic camera in accordance with the invention with the back cover plate open.

Referring to FIG. 1 of the drawings there is shown a photographic camera comprising a housing 10 having a rear cover or back plate 12 pivotally mounted on one end thereof by means of a hinge 14. A take-up spool 16 is rotatably mounted within a cavity 17 of the housing 10 adjacent hinge 14 and may be detachably supported on the housing 10 in a known manner. A cavity 18 in the housing 10 opposite the take-up spool 16 is adapted to receive a film supply means comprising a cassette or cartridge 20 containing a preloaded film 22.

The housing 10 defines a film gate 24 over which the film 22 is transported from cassette 20 to take-up spool 16 by operation of the driving means and film transport means later to be described. A pressure plate 26 on the cover plate 12 and surfaces 28 and 30 of the housing 10 define a channel through which the film is moved, the inclined surface 30 serving to maintain alignment of the film with the gate 24. The cover plate 12 is further provided with arcuate surfaces 32 which facilitate initial take-up of the leading portion 34 of the film on the take-up spool 16 as will later be described in more detail.

Referring specifically to the take-up spool 16 this part is provided with at least one slot 36 having an insertion opening 38 in the peripheral surface 40 of the spool. The slot 36 extends inwardly from the opening 38 in surface 40 at an angle with respect to the spool axis and then curves to extend parallel to the spool axis.

The slot 36 is provided to receive the leading portion 34 of the film 22, during initial take up of the film on the spool. This is accomplished by inserting the edge of the portion 34 into the opening 38 and then sliding the portion 34 into the section of slot 36 which is parallel to the spool axis. The surfaces of slot 36 may be provided with guide portions (not shown) for accurately defining the position of the leading portion 34 of the film 22.

The leading film portion 34 is preferably inserted into slot 36 whereby the film end projects over take-up spool 16 and over the spool chamber 17 as shown in the drawings.

Still referring to FIG. 1 of the drawings, a film transporting means comprising a film feed sprocket 42 is mounted on a shaft 43 which in turn is rotatably supported on the housing 10 adjacent to the cassette 20. The film feed sprocket 42 comprises a spool portion provided with two spaced sprocket portions 44 defining sprocket teeth 45 adapted to engage the film perforations to transport the same toward spool 16 in response to rotation of sprocket 42. The sprocket portions 44 may be formed integrally with the sprocket spool or may comprise separate parts rigidly secured to the spool.

The take-up spool 16 and drive shaft 43 for sprocket 42 are preferably both coupled to and rotated by a drive mechanism which includes a manually operative button 46 carried on the end of a suitable lever (not shown), extending through a slot 48 formed in the housing 10. The button 46 may also be arranged to actuate the shutter cocking mechanism for the camera in a manner known to those skilled in the art. Preferably, displacement of the button 46 rotates the sprocket 42 an amount sufficient to advance the film one exposure position. A counting mechanism of a type known in the art may be associated with the sprocket 42 to indicate the number of frames exposed and to limit rotation of sprocket 42 in response to actuation of button 46 to the angular distance required to advance the film one position. The film take-up rate of spool 16 is equal to and preferably greater than the linear film transfer rate of the sprocket 42 regardless of the amount of film wound on the spool 16, so as to prevent the occurrence of film slack between the sprocket 42 and spool 16, or alternatively for retracting teeth 45. The uncoupling may be achieved by driving spool 16 at a take-up rate exceeding the linear transfer rate of sprocket 42 and coupling a slip clutch between the drive mechanism and the spool 16 to absorb the overdrive of the spool 16. The arrangement of a suitable driving mechanism, slip clutch, and counter mechanism to rotate the spool 16 and sprocket 42 in this manner in response to displacement of button 46 is within the capabilities of one skilled in the art and further description is deemed to be unnecessary. The teeth retracting means will be described in detail in conjunction to the description of FIGS. 2 and 3.

To provide for film rewind, a means may be provided for uncoupling the shaft 43 from the drive mechanism to permit free rotation of the sprocket 42. This means includes a button 47 for axially displacing the shaft 43 to release a driving connection (not shown) between sprocket 42 and the driving mechanism. The drive mechanism and driving connection can be further arranged so that subsequent actuation of button 46 will automatically restore the coupling of sprocket 42 to the driving mechanism. The arrangement of such uncoupling and recoupling means are within the capabilities of one skilled in the art and further description is deemed unnecessary.

During rewind, rotation of the take-up spool 16 occurs by means of the slip clutch associated with the drive mechanism in a manner well known to those skilled in the art.

Referring now to the operation of the embodiment of the invention disclosed in FIG. 1 of the drawings, the cassette 20 containing the film 22 is inserted into cavity 18 of camera housing 10 while the camera back plate 12 is open. The leading portion 34 of the film 22 is drawn from the cassette 20 until it projects over the opposite end of the camera housing 10 as shown whereupon the edge of said leading portion is inserted into the opening 38 and then slid into the parallel section of slot 36.

After insertion of the film in the above manner the camera back plate 12 is closed. Upon movement of the back plate 12 to its closed position, the leading portion 34 of the film 22 extending beyond the spool 16 is engaged by the arcuate surfaces 32 and other surfaces of the cover plate 12 and positioned into the cavity 17, these surfaces also preventing the leading portion of the film from moving under pressure plate 26. During the closing of cover plate 12 the film 22 is engaged by pressure plate 26 and moved into engagement with surfaces 28 and 30 which align the film with the aperture 24.

After closure of the back plate 12, the button 46 is displaced to drive take-up spool 16 and sprocket 42 in the manner hereinbefore described to effect film transport and position the first section or frame of the film to be exposed in alignment with the aperture 24. If the leading portion 34 of the film 22 is tightly received in slot 36 the film will be secured to the take-up spool at the very beginning of film transport. Even with a relatively loose fit the film will be secured to the take-up spool soon after film transport is commenced by winding of the film on the spool 16.

As hereinbefore described the take-up spool 16 may be overdriven relative to sprocket 42 to prevent the occurrence of film slack between the take-up spool and the sprocket and a slipping clutch provided to absorb the take-up spool overdrive. It will be apparent the take-up rate of spool 16 will be minimum at the beginning of film transport and will increase with increase in the amount of film wound thereon. The take-up spool 16 may be driven to establish a take-up rate equal to or only very slightly exceeding the transfer rate of sprocket 42 when the spool is empty to avoid film tension results from over driving the take-up spool while the film is initially being secured thereto.

During initial insertion of the film portion 34 into slot 36 of take-up spool 16 it is desirable that slot 36 be in a position substantially parallel to the film track defined by surfaces 28 and 30. It will be apparent that means can be provided for arresting the spool 16 in this position at the end of rewind. Moreover, detent means can be provided for arresting the spool 16 in this position upon opening of the camera back plate 12. The latter means may take the form of a detent adapted to engage and retain the take-up spool when the back plate 12 is opened and disengaged upon closing of the back plate 12 or upon insertion of the leading portion 34 of the film into the camera.

Alternatively, attachment of the leading portion 34 of the film 22 to the take-up spool 16 may also be facilitated by the provision of more than one slot 36 so that one slot is always in an approximate position for insertion of the leading portion of the film. To further improve the insertion and winding process the core of the take-up spool can be provided with a diameter greater than that of conventional take-up spools.

Referring to FIGS. 2 and 3 of the drawings we have specifically shown another embodiment of the invention wherein parts corresponding to those shown in FIG. 1 have been assigned like reference numerals with the suffix letter *a*. The embodiment illustrated in FIG. 2 differs from that disclosed in FIG. 1 in that the film feed sprocket 42a is positioned adjacent the take-up spool 16a. This arrangement permits the use of a more simplified drive mechanism, but can result in the perforations of the leading portion 34a of the film 22a catching on the teeth 45a of the sprocket 42 after said leading portion is disengaged from slot 36a in the take-up spool 16a during rewind. To avoid this condition the sprocket teeth 45a on the lower end of the sprocket 42a may be retractable for the purpose of disengaging the sprocket teeth from the perforations during rewind. Referring to FIG. 3 of the drawings, the shaft 43a is slidably supported in the walls of the housing 10a to be axially displaced relative thereto by button 47a similar to the FIG. 1 embodiment. A spring 54 encircling shaft 43a is mounted in compression between the button 47a and a retaining washer 56 to bias the shaft to the position shown in FIG. 3. The sprocket teeth 45a are carried on the ends of leaf springs 58 respectively which have an inherent bias serving to position said springs into engagement with the shaft 43a. In the position of the shaft 43a shown in FIG. 1 the springs 58 position the teeth 45a whereby they extend through openings 60 to engage the film perforations. If shaft 43a is displaced upward, as viewed in FIG. 3, the springs 58 will move into engagement with a reduced diameter portion 63 of shaft 43a under the inherent biasing force of the springs 58 to thereby retract the teeth 45a. A detent means comprising a pawl member 62 may be displaced into engagement with a suitable notch or other abutment formed on the shaft 43a to retain the same in the displaced position thereof. At the end of rewind the pawl 62 may be released whereupon shaft 43a will return to the position shown in FIG. 3 under the bias of spring 54. Similar to the FIG. 1 embodiment, axial displacement of the shaft 43a is also effective to uncouple the film feed sprocket from the drive mechanism. Teeth 45 of sprocket 42 may also be provided with similar retracting means to facilitate film rewind.

The invention has been described in detail with particular reference to preferred embodiments thereof, but it will be unde rstood that variations and modifications can be effected within the spirit and scope of the invention.

It is claimed and desired to secure by Letters Patent of the United States:

1. A photographic camera adapted to receive a supply of strip film, said camera comprising:
   (a) a housing;
   (b) a region in said housing to receive the supply of film;
   (c) a film take-up spool rotatably mounted in said housing spaced from said region for receiving film from the supply;
   (d) a sprocket wheel in said housing between said region and said take-up spool for transporting the film between said region and said take-up spool, said sprocket wheel having teeth movable between extended positions in driving contact with the film and retracted positions not in driving contact with the film; and (e) means for moving said teeth toward the retracted positions thereof to interrupt the driving contact between said teeth and the film during rewinding of the film toward said region.

2. A photographic camera as claimed in claim 1 wherein said film take-up spool has an elongated slot therein for receiving a leading portion of the film.

3. A photographic camera as claimed in claim 1 further comprising:
(a) a shaft in said housing, said sprocket wheel being mounted on said shaft; and
(b) a second sprocket wheel mounted on said shaft, said second sprocket wheel having teeth fixed to said shaft.

4. A photographic camera as claimed in claim 1 further comprising:
(a) a shaft rotatably carried in said housing, said sprocket wheel being mounted on said shaft; and
(b) means including said teeth retracting means to axially move said shaft.

5. A photographic camera as claimed in claim 1 further comprising:
(a) an axially movable shaft rotatably carried in said housing, said sprocket wheel being mounted on said shaft;
(b) means, including said teeth retracting means, for biasing said teeth toward said retracted positions;
(c) means normally engaging said shaft for preventing said teeth from moving toward said retracted positions; and
(d) means for axially moving said shaft to disable said shaft engaging means to allow said teeth to move toward said retracted positions.

6. A photographic camera as claimed in claim 1 further comprising drive means for said sprocket wheel and said take-up spool for effecting a film take-up rate of said take-up spool equal to at least the film transfer rate of said sprocket wheel.

7. A photographic camera as defined in claim 1 wherein said region and said take-up spool are spaced at opposite ends of said housing and said sprocket wheel is supported on said housing immediately adjacent said region.

References Cited
UNITED STATES PATENTS

| | | | |
|---|---|---|---|
| 1,898,141 | 2/1933 | Piper | 226—81 |
| 2,487,870 | 11/1949 | Harrison | 226—81 |
| 2,554,892 | 5/1951 | Briskin | 226—81 |
| 2,556,930 | 6/1951 | Miller | 226—81 |
| 2,782,701 | 2/1957 | Heler | 95—31 |
| 2,913,093 | 11/1959 | Bevan | 226—81 |
| 3,066,884 | 12/1962 | Rehn | 242—71 |
| 3,319,550 | 5/1967 | Broche | 242—71.6 |
| 3,377,963 | 4/1968 | Goshima et al. | 95—31 |

NORTON ANSHER, Primary Examiner

J. F. PETERS, Jr., Assistant Examiner

U.S. Cl. X.R.

226—81; 242—55.13, 71.6.